(12) United States Patent
Quist et al.

(10) Patent No.: US 12,210,134 B2
(45) Date of Patent: Jan. 28, 2025

(54) ENVIRONMENTAL MONITORING SYSTEM

(71) Applicant: HADRONEX, INC., Escondido, CA (US)

(72) Inventors: Gregory M Quist, Escondido, CA (US); David A Drake, Escondido, CA (US); Glen A. Hill, Columbia, SC (US); Lawrence B Merchell, San Marcos, CA (US)

(73) Assignee: HADRONEX, INC., Escondido, CA (US)

( * ) Notice: Subject to any disclaimer, the term of this patent is extended or adjusted under 35 U.S.C. 154(b) by 0 days.

(21) Appl. No.: 18/405,580

(22) Filed: Jan. 5, 2024

(65) Prior Publication Data
US 2024/0219604 A1    Jul. 4, 2024

Related U.S. Application Data

(63) Continuation of application No. 17/660,205, filed on Apr. 21, 2022, now abandoned.
(Continued)

(51) Int. Cl.
| | |
|---|---|
| *G01W 1/10* | (2006.01) |
| *B64F 3/00* | (2006.01) |
| *B64U 10/13* | (2023.01) |
| *G01W 1/04* | (2006.01) |
| *G06V 20/17* | (2022.01) |

(Continued)

(52) U.S. Cl.
CPC .............. *G01W 1/10* (2013.01); *G06V 20/17* (2022.01); *B64C 39/022* (2013.01);
(Continued)

(58) Field of Classification Search
CPC .................. G01W 1/10; G06V 20/17; B64U 2101/302101; B64U 2101/352101; B64U 2101/201; B64U 2101/13; B64F 3/00
See application file for complete search history.

(56) References Cited

U.S. PATENT DOCUMENTS

| | | |
|---|---|---|
| 2012/0105214 A1 | 5/2012 | Sanders |
| 2012/0169510 A1 | 7/2012 | Pamulaparthy |

(Continued)

FOREIGN PATENT DOCUMENTS

| | | |
|---|---|---|
| CN | 208672021 U | 3/2019 |
| CN | 208818849 U | 5/2019 |

OTHER PUBLICATIONS

TrasviÃ±a-Moreno et al. (Unmanned Aerial Vehicle Based Wireless Sensor Network for Marine-Coastal Environment Monitoring. Sensors (Basel). Feb. 24, 2017;17(3):460. doi: 10.3390/s17030460. PMID: 28245587; Pmcid: PMC5375746.) (Year: 2017).*
(Continued)

*Primary Examiner* — Manish S Shah
*Assistant Examiner* — Christian T Bryant
(74) *Attorney, Agent, or Firm* — Jonathan Kidney; Intelink Law Group, P.C.

(57) ABSTRACT

An environmental monitoring network has transportable, self-contained, environment sensing capsules, each capsule is water-proof, with first and second sections, the second section being hollow. Apertures in the capsule's housing enable fluid and gas entry wherein first sensor(s) disposed internal to the housing measure within the hollow, and second sensor(s) disposed external to the housing measure external to the housing. A controller and power system are connected to the first and second sensors and transmits measured data. An access entry way is on a side of the housing, enabling access to first sensors, controller system, power system, and the communication system. A central data server is configured to receive and analyze the measurement data sent from the capsules. There is a priority list of appropriate personnel for contact by the central data server in an event there is an emergency condition at a capsule location.

20 Claims, 2 Drawing Sheets

Related U.S. Application Data

(60) Provisional application No. 63/177,832, filed on Apr. 21, 2021.

(51) Int. Cl.
   *B64C 39/02* (2023.01)
   *B64U 101/20* (2023.01)
   *B64U 101/30* (2023.01)
   *B64U 101/35* (2023.01)
   *G01W 1/00* (2006.01)

(52) U.S. Cl.
   CPC ............ *B64C 39/024* (2013.01); *B64F 3/00* (2013.01); *B64U 10/13* (2023.01); *B64U 2101/20* (2023.01); *B64U 2101/30* (2023.01); *B64U 2101/35* (2023.01); *G01W 2001/006* (2013.01); *G01W 1/04* (2013.01)

(56) References Cited

U.S. PATENT DOCUMENTS

| | | |
|---|---|---|
| 2018/0089988 A1 | 3/2018 | Schwarzkopf |
| 2018/0180583 A1 | 6/2018 | Joseph, Jr. |
| 2018/0275313 A1* | 9/2018 | Pierik .................... G01W 1/04 |
| 2021/0061675 A1* | 3/2021 | Bishop .................. E04B 1/2403 |
| 2021/0288988 A1 | 9/2021 | Baughman |

OTHER PUBLICATIONS

Lavars (SkySense pad starts charging your drone the moment it lands, New Atlas, Nov. 5, 2014) (Year: 2014).

Wikipedia ("Panoramic photography." Wikipedia, The Free Encyclopedia. Wikipedia, The Free Encyclopedia, Feb. 23, 2021.) (Year: 2021).

* cited by examiner

ENVIRONMENTAL MONITORING SYSTEM

CROSS-REFERENCE TO RELATED APPLICATION(S)

This application is a continuation of U.S. patent application Ser. No. 17/660,205 filed Apr. 21, 2022, titled Environmental Monitoring System, which claims the benefit of U.S. Provisional Patent Application No. 63/177,832, filed Apr. 21, 2021, the contents of which are hereby incorporated by reference in its entirety.

FIELD

This invention relates to environmental monitoring. More particularly, the invention relates to an integrated system using rapidly deployable, environmental sensor units with communication capabilities for monitoring local environmental changes.

BACKGROUND

Due to the increasing risk and damage from environmental changes, there is a wide ranging and international response to mitigation. Insurance companies are experiencing record costs to repair or replace insured assets. More critically, severe storms, sea level rise and wildfires have cost thousands of lives, worldwide in recent years. This challenge has easily exceeded the capacity of most local emergency response teams to effectively act. Property owners are at the mercy of natural disasters and need any help to avoid extra damage. To address these and other challenges, there has been a growing need for a simple and "self-contained" measurement and communication system that can be easily deployed in the environment or other areas to allow for location-based measurements and assessments.

In view of the above, a network of compact, deployable capsules with integrated sensors with the ability to measure and communicate local measurement information to assist in mitigating environment changes is described. Aspects of system(s) and method(s) capable of addressing such in one form or another are elucidated in the following description.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a self-contained, environment sensing capsule is provided, comprising: a water-proof enclosed housing, having a first and second section, wherein the second section is substantially hollow; at least one aperture in the housing enabling entry of at least one of an external environmental fluid and gas into the second section; one or more first sensors disposed internal to the housing and configured to measure within the second section; one or more second sensors disposed external to the housing and configured to measure external to the housing; a controller system and power system in the housing, connected to the one or more first and second sensors; a communication system in the housing, connected to the controller and the power system, and configured to externally transmit data measured from one or more first and second sensors using at least one of a wired and wireless connection; and an access entry way on a side of the housing, enabling access to at least one of the one or more first sensors, controller system, power system, and communication system, wherein the transmitted data is evaluated for appropriate action.

In another aspect of the disclosed embodiments, the above capsule is provided, wherein the first and second sections of the housing are on opposite ends of the housing; and/or wherein the at least one first and second sensors measures at least one of temperature, smoke, toxicity, pressure, airborne particulates, vibration, strain, acoustic, electromagnetic energy, flow rate, fluid level, velocity, tilt, time of flight and radiation; and/or wherein the power system provides power from at least one of commercial power, solar panels, battery, thermo-electric generator, and a fuel powered generator; and/or further comprising an external display attached to the housing, the display being a printed label or electronic digital display; and/or further comprising a measurement cable extending from a bottom of the housing and connected to the at least one first sensor, to enable measurements from the bottom of the housing; and/or further comprising at least one drone landing pad and drone charger, disposed on a top of the housing; and/or further comprising at least one camera attached to the housing, the camera able to detect at least one of visible, infrared and ultraviolet light; and/or wherein the camera has a panoramic lens; and/or wherein the camera is configured for motion sensitive operation; and/or wherein the wireless connection is at least one of a cell service, satellite, Internet of Things, Wi-Fi and Bluetooth; and/or wherein one of the at least one first and second sensors is configured to detect tampering or vandalism of the capsule; and/or wherein the communication system wireless transmits using at least one of a fixed antenna and floating antenna, where in the floating antenna is utilized when the capsule is submerged; and/or further comprising a central data server, receiving the transmitted data measured from one or more first and second sensors; and/or wherein the access entry way is large enough for an adult person to enter, and the capsule is configured to act as an emergency shelter; and/or wherein the access entry way is controlled by a manual or electronic entry protocol initiated by the person seeking entry; and/or wherein the access entry way is large enough for an adult person to enter and the capsule is configured to act as a controlled entry way to an adjoining shelter or building.

In yet another aspect of the disclosed embodiments, a method for monitoring an environmental condition is provided, comprising: deploying one or more transportable, self-contained, environment sensing capsules to one or more desired locations, each capsule comprising: a water-proof enclosed housing, having a first and second section, wherein the second section is substantially hollow; at least one aperture in the housing enabling entry of at least one of an external environmental fluid and gas into the second section; one or more first sensors disposed internal to the housing and configured to measure within the second section; one or more second sensors disposed external to the housing and configured to measure external to the housing; a controller system and power system in the housing, connected to the one or more first and second sensors; a communication system in the housing, connected to the controller and the power system, and configured to externally transmit data measured from one or more first and second sensors using at least one of a wired and wireless connection; and an access entry way on a side of the housing, enabling access to at least one of the one or more first sensors, controller system, power system, and communication system, wherein the at least one first and second sensors measures at least one of temperature, smoke, toxicity, pressure, airborne particulates, vibration, strain, acoustic, electromagnetic energy, flow rate, fluid level, velocity, tilt, time of flight and radiation, wherein the power system's power is from at least one of commercial power, solar panels, battery, thermo-electric generator, and a fuel powered generator, wherein the wireless connection is at least one of a cell service, satellite, Internet of Things, Wi-Fi and Bluetooth; transmitting the measurement data from each capsule to a central data server; evaluating the measurement data for possible crisis determination; and forwarding at least one of the evaluated data and possible crisis determination to personnel for action.

In another aspect of the disclosed embodiments, the above method is provided, wherein the one or more desired locations is at least one of on a roof, basement, edge of a curb, over a lateral clean out entry, parking lot, beach, storm drain, manhole entry, bluff, building, bridge, roadway, and cliff; and/or further comprising, at least one of directing an alarm to the central data server or to a nearby person via Wi-Fi or Bluetooth, and changing a status of an external display attached to the housing; and/or further comprising flying a drone to or from the one or more capsules, wherein the capsules further comprise at least one drone landing pad and drone charger, disposed on a top of the housings; and/or further comprising taking at least one of a picture and video from a camera attached to each capsule's housing, and taking an environmental measurement from a sensor on the drone.

In yet another aspect of the disclosed embodiments, an environmental monitoring network is provided, comprising: one or more deployable, self-contained, environment sensing capsules placed at one or more desired locations, each capsule comprising: a water-proof enclosed housing, having a first and second section, wherein the second section is substantially hollow; at least one aperture in the housing enabling entry of at least one of an external environmental fluid and gas into the second section; one or more first sensors disposed internal to the housing and configured to measure within the second section; one or more second sensors disposed external to the housing and configured to measure external to the housing; a controller system and power system in the housing, connected to the one or more first and second sensors; a communication system in the housing, connected to the controller and the power system, and configured to externally transmit data measured from one or more first and second sensors using at least one of a wired and wireless connection; and an access entry way on a side of the housing, enabling access to at least one of the one or more first sensors, controller system, power system, and communication system, wherein the at least one first and second sensors measures at least one of temperature, smoke, toxicity, pressure, airborne particulates, vibration, strain, acoustic, electromagnetic energy, flow rate, fluid level, velocity, tilt, time of flight and radiation, wherein the power system's power is from at least one of commercial power, solar panels, battery, thermo-electric generator, and a fuel powered generator, wherein the wireless connection is at least one of a cell service, satellite, Internet of Things, Wi-Fi and Bluetooth; a central data server configured to receive the externally transmitted data and analyze the data; and a priority list of appropriate personnel for contacting by the central data server in an event the analyzed data indicates an emergency at a capsule location.

In yet another aspect of the disclosed embodiments, the above environmental monitoring network is provided, wherein the capsules are positioned at a designated perimeter, wherein sensors in the capsules are configured to detect at least one of seismic, acoustic, infrared, and visual signals around the perimeter to operate as an electronic fence for detection and protection from outside intruders.

DETAILED DESCRIPTION

A unified, multi-function system is described that is able to measure a local condition and communicate the measurements for environment change assessment and countermeasures. The exemplary system can be configured in a variety of methods and can carry a mixture of sensor types and can communicate wirelessly. A data management system is available, allowing for trending and decision support provided from a central data processing system. The exemplary system can be based on an open architecture where data from the measurement systems can be read by connections through, for example, published application programming interfaces (APIs). It can also allow for local communications with industry standard communications and with satellite communication for worldwide access. It can also operate from a mixture of power sources for robustness.

Figure 1:
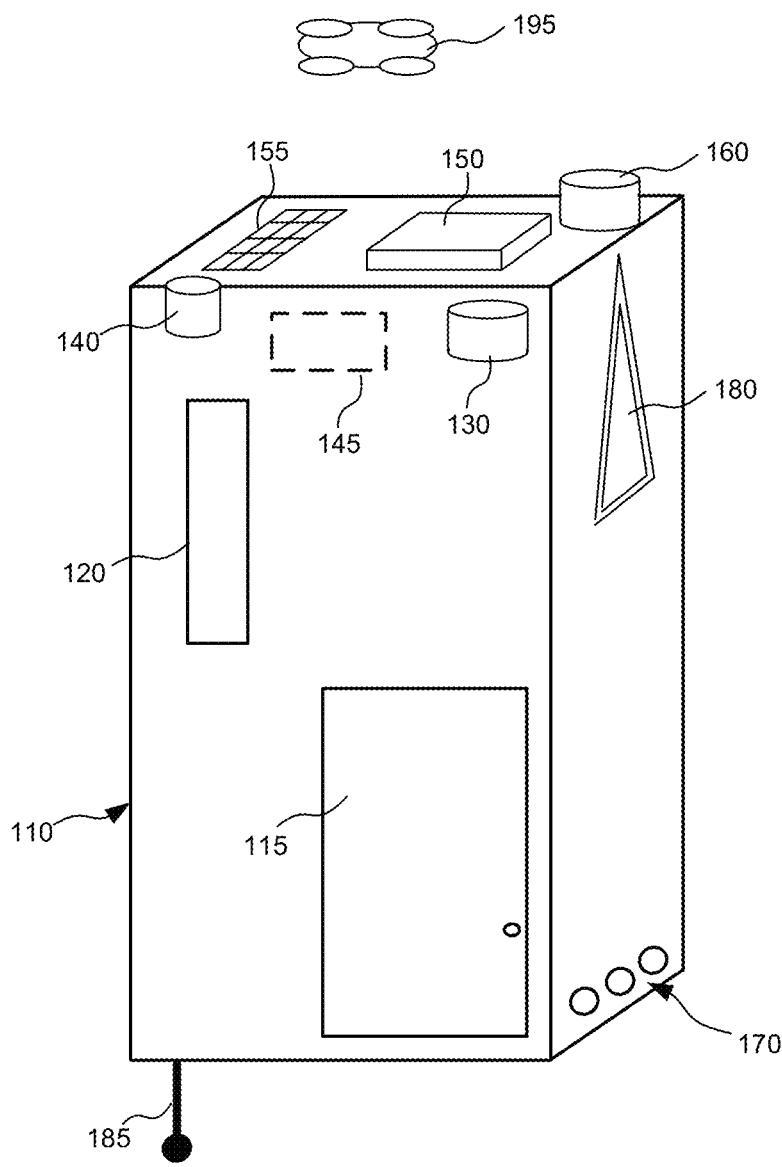
FIG. 1 is a generalized illustration of an exemplary environmental measurement capsule containing a deployable capsule-like housing with various sensors and electronics.

FIG. 1 is a generalized illustration of an exemplary environmental measurement capsule 100 containing a deployable housing 110 having one or more environmental sensors, communication devices, power, and other systems in or attached to the housing 110. For example, FIG. 1 shows one or more environmental sensors 120, 130, 140, controller/power system 145, optional drone pad/charger 150, solar panel 155, and communication system 160, and one or more apertures 170 to allow water or other fluids/gases to ingress and egress the housing 110. The one or more apertures 170 may be placed at any location on the housing 110, understanding they may be used for enabling measurement (as well as optionally operating to prevent "floating" of the housing 110 when positioned in a flooded area).

One or more sensors 120, 130, 140 can be positioned outside, inside and/or bordering the surfaces of the housing 110, depending on the senor type used and its purpose. Sensors 120-140, etc. can be of the form to detect environmental conditions, such as one or more of flow, temperature, pressure, toxicity, velocity, tilt, strain, acoustic, height, light, as well as perform as water sampling devices, gas measurement, acoustic sensing, biological sensing, security sensing, or provide any environmental measurement.

Other non-limiting possible sensor types are: microelectronic machine (MEMS) tilt sensors to detect earthquake motion, landslide failures, bluff failures or other structural failure, such as on a building, bridge, roadway, cliffs or other venues. The sensors could also act as a camera, include strain gauges, seismic microphones or electromagnetic seismometers, etc. As there are numerous types of sensors, it is understood the above list is offered only as a sample and not as a limiting example. Thus, other types and kinds of sensors are understood to be within the purview of this disclosure.

As one possible operational example, sensor 120 may be externally attached to the housing 110 and operate as an external water/fluid level sensor, wherein an internal-to-housing water/fluid level sensor (not shown) can be used for determining water/fluid within the housing 110. It is understood that one or more portions of the housing 110 will be hollow, allowing entry of fluids/gases for measurement by the internal sensor(s). By comparing the sensor(s)' measurements, a height or rate of flow can be assessed, as well as other environmental factors. As another non-limiting example, external sensor 120 may be a wind forcer sensor, while internal sensor (not shown) is a temperature sensor, and the measurements may indicate a fire intensity level (for a forest fire, example) and the speed of the fire (wind), or the internal sensor may act as an alarm when the internal temperature exceeds a safe operating value. Moreover, additional sensors 130, 140, etc. can be positioned on different locations of the housing 110 for measuring different environmental factors and/or provide housing "position-specific" measurements. As a non-limiting example, there may be multiple water/fluid level sensors on the exterior of the housing 110, wherein upon a heavy flood, a lower sensor may be submerged while the higher sensor(s) are able to successfully measure flood height. Another non-limiting example is that the various sensors (appropriately configured) may provide height-based wind velocity measurements, rainfall measurements, impact force of hail, humidity, air pollution, detection of micron particles, alpha, beta, gamma radiation, wind direction, water pH, rain pH, water total dissolved solids, salinity, turbidity, etc.

The exemplary housing 110 is designed to be robust enough for environmental use, transportable, and with the appropriate electronics and sensors, is able to operate as a capsule type device—one that can be placed in a desired location, turned on (if power is internal) and measurements made, transmitted to a central monitoring system for appropriate assessment and response. The housing 110 can have one or more entry or access panel(s) 115 to allow access to the internal devices/sensors within the housing 110. The housing 110 is waterproof and can be made from a metal, plastic, aluminum, stainless steel, galvanized steel, resin, fiberglass, titanium, plexiglass, Kevlar, etc. The height, shape, size of the housing 110 can vary, depending on the environmental factor being tracked, purpose or the placement location. For example, it may be as short as 12 inches or exceed 80 inches. As a non-limiting example, for flood or water assessment, the exemplary capsule 100 could be mounted on traffic signal poles or other structures in streets that are subject to flooding. Alternatively, the capsule 100 could be mounted on the edge of a curb, over a lateral clean out entry, a parking lot, a beach, a storm drain, or a manhole entry. These are just examples of numerous locations that could accommodate a suitably sized capsule 100, wherein the capsule's size and shape may be designed accordingly.

As stated above, one or more portions of the housing 110 may be hollow, enabling entry of fluid/gases through appropriately placed apertures in the housing. The hollow portion(s) can be used for other purposes, as further described below.

The entry panel 115 can be limited in size (as shown in FIG. 1) or be an entire side (or top) of the housing 110, that is, a face may be a hinged or sliding door to allow internal access. The perimeter of the entry panel 115 can be sealed a to prevent external environmental penetration, if so desired. The access will be secured by means of a lock or other mechanism to prevent unauthorized entry. Non-limiting examples of the securing means can be a key/lock, digital, seal, etc. Such securing mechanisms are well-known in the art and are understood to be within the ordinary scope of this disclosure.

It should be understood that FIG. 1's illustrated shapes, locations, arrangement of the various sensors 120-140, housing 110, and other aspects (later described) are not to be construed as limiting or defining the capsule's final or only available configuration, or the placement, number of sensors, electronics, etc. For example, while the housing 110 is illustrated as being rectangular in shape, it may be desired to have it cylindrically shaped, (e.g., barrel), or cone-like, or pyramidal, or other-shaped according to design preference. Therefore, based on desired use the number of, types of, locations of, shape of, and other factors of the exemplary capsule 100 may vary, without departing from the spirit and scope of this disclosure. As a non-limiting example, when the exemplary capsule 100 is used for flood assessment, the housing 110 can be shaped or weighted in a manner to deter floating or toppling when placed on the ground. Appropriate securing or attachment flanges, hooks, holes may be devised in the housing 110 to allow securing it to a particular object or location.

Controller/power system 145 can be disposed interior to the housing 110, wherein management, powering of the one or more of the sensors 120-140, etc., optional drone pad/charger 150, solar panel 155, and communication system 160 can be achieved. It should be understood that controller/power system 145 may be separate, independent systems or combined. Further, the controller (or aspects of the controlling) may be housed in the communication system 160, depending on the capabilities of the communication system 160.

The various electronic devices of the exemplary capsule 100 will need power for proper operation, which can be provided via power system 145 which may have an external renewable energy source (e.g., solar panel 155). Alternatively, the power system 145 may be a rechargeable battery or even a direct-power line connection. Thus, power may come from any one or more of commercial, solar panels, a thermo-electric generator, or a fuel powered generator, etc. This power can provide all power consumed by the capsule 100. It can also include both primary and renewable batteries for adverse conditions.

Data from the respective sensors 120-140, etc. is externally transmitted via the communication device 160 using a wired connection or wireless to an external central server system (not shown) performing data collection, management review and reporting. Communication may be bi-directional. The communication device 160 may be internal to or external to the housing 110. The communication device 160 can include multiple antennas and frequency, protocol capabilities to support one or more different types of communication, for example, satellite, cell phone, Internet of Things, Wi-Fi, Bluetooth and so forth. The communication device 160 may also directly or indirectly utilize a "floating" antenna to allow the capsule 100 to communicate while submerged. The floating antenna may be released to float from the housing 110 by a float detection mechanism.

The housing 110 may also have a display 180 that can be used for advertising, security warnings, operational status, traffic warnings or other communications with the public. Display 180 may be a printed label, or even an integrated digital display.

The top of or some part of the housing 110 may have a docking port 150 for landing and/or recharging a drone 195. The docking port 150 may be "openable" or configured as a "shed" to allow entry and protection of a drone 195 while docking. The drone 195 can be used to provide capabilities that extends the authority and knowledge of the owner agency beyond the local area. Communication can be made to and from the drone 195 for remote monitoring (fire, flood, earthquake, accident, etc.) with the ability to land at an adjacent site if primary location is unavailable (under water, damaged, low power, etc.). In some embodiments, the drone 195 can land on and be serviced from the floating antenna. As one non-limiting example, upon a threshold condition from the servicing capsule 100, a resident drone 195 may lift off and provide a bird's-eye-view of the environment around the capsule 100, to provide a broader scale assessment of the current environmental condition. This capability is invaluable for a flood, earthquake or wild fire situation. The drone 195 may also have communication capabilities that allow it to act as an intermediary to a central system. The drone 195 may also have additional sensor(s) to enable it to perform an environmental measurement, separate from the capsule's sensors. In some embodiments, the drone may be tethered to the capsule 100.

The bottom of the exemplary capsule 100 can be designed to allow the bottom interior to be flooded, wherein internal sensors can detect the water level, by any conventional or non-conventional method. Non-limiting examples are mechanical, float, ultrasonic, radar, pressure, or time of flight cameras, etc. The exemplary capsule 100 can also include pressure sensors to detect the depth of water over it if it becomes inundated. Moreover, the internal systems in the housing 110 can be built to support total immersion, or the internal systems are disposed high enough in the housing 110 to avoid immersion. In some embodiments, the internal systems may be separated by a water proof barrier (e.g., sealed) from water or fluids or gases entering the bottom of the housing 110. In some embodiments, a sensor cable 185 can extend below the bottom of the housing 110 to reach the surface of an underlying bottom of water for level sensing.

The exemplary capsule 100 may be designed to be installed on flat roofs to defend against drain stoppages that could collapse the roof. The exemplary capsule 100 may be deployed by securely fastening the housing 110 to a surface so that if flooded by flowing water, the housing 110 will resist displacement or damage. Other possible installations can be for a parking lot, beach, open field, roadway turnout, or similar location in order to detect if surface water has risen in that area.

The exemplary capsule 100 can be mounted on a roof or other structure in order to detect trapped water that cannot drain due to blocked drains, ice, snow, or other failures. This allows the capsule 100 to direct an alarm to any of its supported communications systems.

Figure 2:
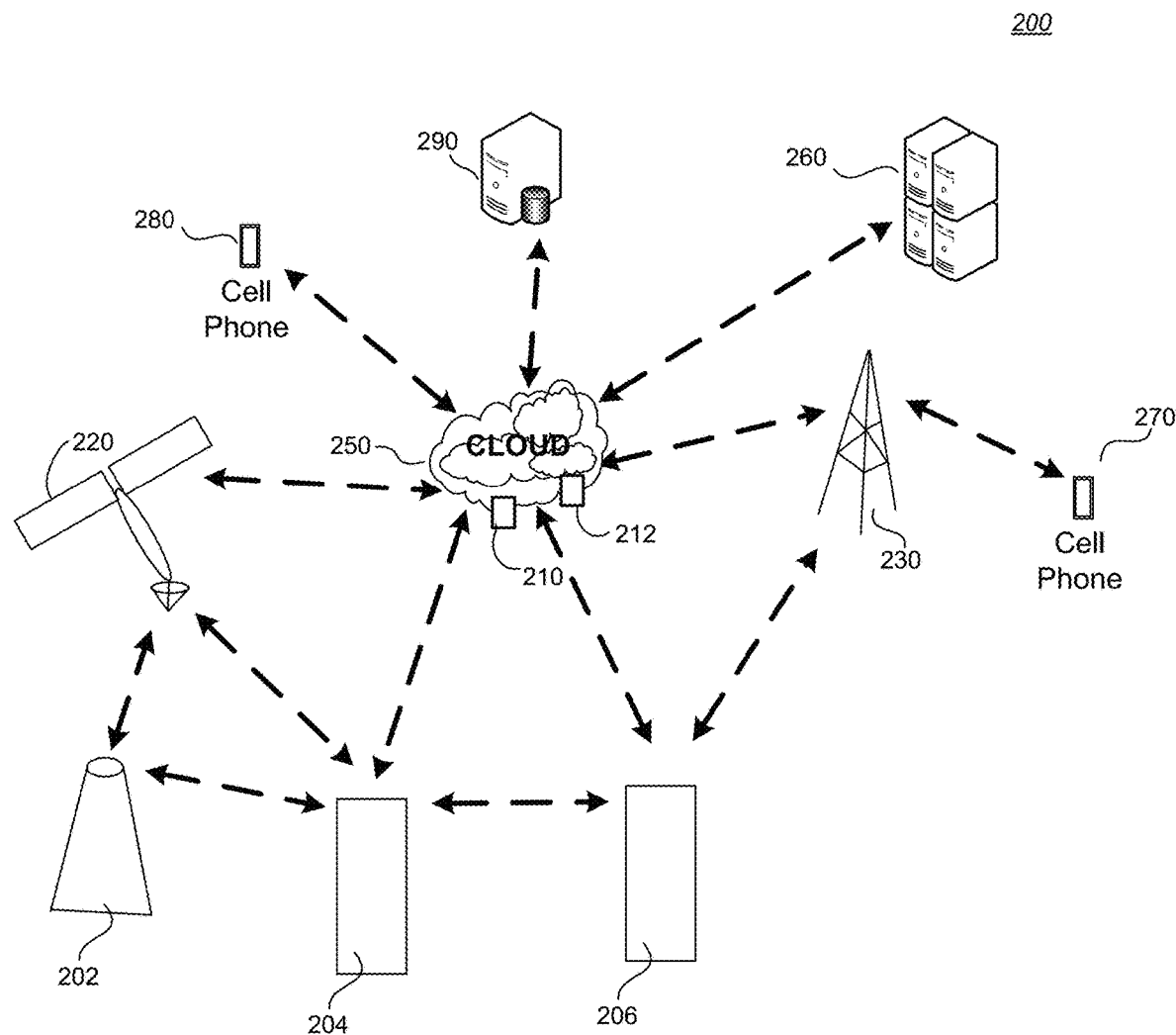
FIG. 2 is an illustration of a system-level implementation of exemplary sensor capsules and associated systems.

FIG. 2 is an illustration of a system-level implementation 200 of exemplary sensor capsules and associated systems. A plurality of sensor capsules 202, 204, 206 may be positioned at various measurement locations wherein data from (or to) the capsules are transmitted to a central server(s) 260, via any one or more of satellite 220, cell tower 230, and cloud 250. In some embodiments, the satellite 220 or cell tower 230 may bypass the cloud 250 and communicate to the central server(s) 260. Internet gateways 210, 212 are shown that enable wireless communication from/to the deployed capsules 204, 206 or other devices into the cloud 250 and may provide communication either directly or indirectly to other cloud connected devices (e.g., cell phone 270, smart device 280, computer 290, etc.).

It is understood that depending on implementation preference, the exemplary capsule(s) can communicate using any one or more of satellite, terrestrial cell phones, Wi-Fi, Bluetooth, or any type of wireless or optical communications, to the central server(s) 260. The communications allow for two-way message travel for commands to the capsules 202, 204, 206 as well as to ancillary devices (smart devices, other connected systems) and data transfers. In some embodiments, the exemplary system 200 can select among the best methods of communications for best reliability, speed, and cost. The central data service can be a cloud based or private data center for the storage of data, formatting of displays and reports, web-based user access for command and control, backup of data, and downloading of new software and configurations.

Data from each individual capsule in the underlying network is sent wirelessly (or through other means) to the central server(s) 260 or processor that aggregates these data and analyzes the data. The analysis provides a real-time triage priority to for decision support. A priority list is managed, having contacts of the appropriate personnel, such as first responders, to optimize labor and resources in an emergency. The system 200 can also communicate with various capsules 202, 204, 206 to support peer-to-peer communications and data support. The communications can include drone repeaters to extend local range between systems.

Wi-Fi or Bluetooth within the capsules 202, 204, 206 connections could be allowed for any nearby person to be able to receive status and warning messages directly, without having to use Internet connectivity. Such connections would be secured from a central service and would likely include a fee. Alternately, the occupants of a building so equipped with a monitoring capsule could get Internet, SMS or other types of warning about the status of the building.

As is apparent, the exemplary capsules 202, 204, 206 described above can include a variety of environmental sensors for fire, smoke, heat, toxic gas, sampling from an underlying water way, airborne particulates, seismometers, radiation sensors, etc. The exemplary capsules 202, 204, 206 can include sensors for electric arcing as well as camera(s) to monitor the locale for hazards or interference. The camera (s) can be configured as a panoramic camera to record imagery of the locale, including motion and sound detection. These camera(s) can be for visible light, infrared and/or ultraviolet sources, if so desired.

The exemplary capsules 202, 204, 206 can also contain a "panic switch" for a person to trigger to seek help. In some embodiments, the exemplary capsules 202, 204, 206 could be of sufficient size that by triggering access, a door could be opened to allow a person or persons to shelter inside. Alternately the exemplary capsules 202, 204, 206 could control access to an adjoining or nearby secure location. In addition, the access could be controlled to safety or security equipment for approved personnel.

In some embodiments, the exemplary capsules 202, 204, 206 can have loud audible annunciator alarms, bells, sirens and flashing lights to alert nearby people to an approaching hazard such as a fire, tsunami, flash flood, or other hazard.

While the exemplary capsules are shown in the context of an outdoor environment, it is possible such a capsule can be placed internal to a building or other structure to monitor a variety of environmental issues, but in particular for severe flooding from broken or frozen pipes, a flooded basement, or a fire protection sprinkler system, for example.

In some embodiments, the exemplary capsules 202, 204, 206 can have one or more of the internal sensors used to detect tampering or vandalism and provide a real-time signal to appropriate persons to respond to the vandalism or attempted destruction of the capsule.

In another embodiment, capsules of this type can be used as border security sensors, in which the capsules' sensors detect: seismic, acoustic, infrared, and visual signals around the capsules to provide an "electronic" fence at borders of countries, or other areas that are looking for protection from outside intruders.

As is apparent, the exemplary capsules described in this and the previous FIG. provide a convenient one-shop mechanism for easy and widespread deployment, capable for use in an impending disaster event or environment monitoring. When supported with one or more such capsules and an associated central assessment system, the exemplary system provides real-time monitoring and alerting capabilities to various organizations and personnel, to assist in mitigating catastrophes.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A self-contained, portable capsule for real-time measurement of an external environment condition, comprising:
   a portable, self-contained, water-proof, enclosed, non-domicile capsule-like housing, having an upper compartment and a lower compartment, wherein the-lower compartment is hollow;
   at least one aperture in the housing enabling entry of at least one of an external environmental fluid and gas into the lower compartment;
   one or more first sensors disposed internal to the housing and configured to measure the at least one of the external fluid and gas within the lower compartment;
   one or more second sensors disposed external to the housing and configured to measure an environment external to the housing; a controller system and power system in the housing, connected to the one or more first and second sensors;
   a communication system in the upper compartment of the housing, connected to the controller and the power system, and configured to externally transmit data measured from one or more first and second sensors using at least one of a wired and wireless connection; and
   a maintenance access panel on a side of the housing, enabling access to at least one of the one or more first sensors, controller system, power system, and communication system,
   wherein the transmitted data is evaluated for action.

2. The capsule of claim 1, wherein the at least one first and second sensors measures at least one of temperature, smoke, toxicity, pressure, airborne particulates, vibration, strain, acoustic, electromagnetic energy, flow rate, fluid level, velocity, tilt, time of flight and radiation.

3. The capsule of claim 1, wherein the power system provides power from at least one of commercial power, solar panels, battery, thermo-electric generator, and a fuel powered generator.

4. The capsule of claim 1, further comprising an external display attached to the housing, the display being a printed label or electronic digital display.

5. The capsule of claim 1, further comprising a measurement cable extending from a bottom of the housing and connected to the at least one first sensor, to enable measurements from the bottom of the housing.

6. The capsule of claim 1, further comprising at least one drone landing pad and drone charger, disposed on a top of the housing.

7. The capsule of claim 1, further comprising at least one camera attached to the housing, the camera able to detect at least one of visible, infrared and ultraviolet light.

8. The capsule of claim 7, wherein the camera has a panoramic lens.

9. The capsule of claim 7, wherein the camera is configured for motion sensitive operation.

10. The capsule of claim 1, wherein the wireless connection is at least one of a cell service, satellite, Internet of Things, Wi-Fi and Bluetooth.

11. The capsule of claim 1, wherein one of the at least one first and second sensors is configured to detect tampering or vandalism of the capsule.

12. The capsule of claim 1, wherein the communication system wireless transmits using at least one of a fixed antenna and floating antenna, where in the floating antenna is utilized when the capsule is submerged.

13. The capsule of claim 1, further comprising a central data server, receiving the transmitted data measured from one or more first and second sensors.

14. A method for monitoring an environmental threat condition, comprising:
   deploying one or more transportable, self-contained, environment sensing, non-domicile capsules to one or more desired locations, each capsule comprising:
   a water-proof enclosed housing, having a first and second section, wherein the second section is hollow;
   at least one aperture in the housing enabling entry of at least one of an external environmental fluid and gas into the second section;
   one or more first sensors disposed internal to the housing and configured to measure within the second section;
   one or more second sensors disposed external to the housing and configured to measure external to the housing;
   a controller system and power system in the housing, connected to the one or more first and second sensors;
   a communication system in the housing, connected to the controller and the power system, and
   configured to externally transmit data measured from one or more first and second sensors using at least one of a wired and wireless connection; and
   a maintenance access panel on a side of the housing, enabling access to at least one of the one or more first sensors, controller system, power system, and communication system,
   wherein the at least one first and second sensors measures at least one of temperature, smoke, toxicity, pressure, airborne particulates, vibration, strain, acoustic, electromagnetic energy, flow rate, fluid level, velocity, tilt, time of flight and radiation, wherein the power system's power is from at least one of commercial power, solar panels, battery, thermo-electric generator, and a fuel powered generator,
   wherein the wireless connection is at least one of a cell service, satellite, Internet of Things, Wi-Fi and Bluetooth;

transmitting the measurement data from each capsule to a central data server;

evaluating the measurement data for possible crisis determination; and forwarding at least one of the evaluated data and possible crisis determination to personnel for action.

15. The method of claim 14, wherein the one or more desired locations is at least one of on a roof, basement, edge of a curb, over a lateral clean out entry, parking lot, beach, storm drain, manhole entry, bluff, building, bridge, roadway, and cliff.

16. The method of claim 14, further comprising, at least one of directing an alarm to the central data server or to a nearby person via Wi-Fi or Bluetooth, and changing a status of an external display attached to the housing.

17. The method of claim 14, further comprising flying a drone to or from the one or more capsules, wherein the capsules further comprise at least one drone landing pad and drone charger, disposed on a top of the housings.

18. The method of claim 17, further comprising taking at least one of a picture and video from a camera attached to each capsule's housing, and taking an environmental measurement from a sensor on the drone.

19. An environmental monitoring network, comprising:
one or more deployable, self-contained, environment sensing, non-domicile capsules placed at one or more desired locations, each capsule comprising:
a water-proof enclosed housing, having a first and second section, wherein the second section is hollow;
at least one aperture in the housing enabling entry of at least one of an external environmental fluid and gas into the second section;
one or more first sensors disposed internal to the housing and configured to measure within the second section;
one or more second sensors disposed external to the housing and configured to measure external to the housing;
a controller system and power system in the housing, connected to the one or more first and second sensors;
a communication system in the housing, connected to the controller and the power system, and configured to externally transmit data measured from one or more first and second sensors using at least one of a wired and wireless connection; and
a maintenance access panel on a side of the housing, enabling access to at least one of the one or more first sensors, controller system, power system, and communication system,
wherein the at least one first and second sensors measures at least one of temperature, smoke, toxicity, pressure, airborne particulates, vibration, strain, acoustic, electromagnetic energy, flow rate, fluid level, velocity, tilt, time of flight and radiation, wherein the power system's power is from at least one of commercial power, solar panels, battery, thermo-electric generator, and a fuel powered generator,
wherein the wireless connection is at least one of a cell service, satellite, Internet of Things, Wi-Fi and Bluetooth; a central data server configured to receive the externally transmitted data and analyze the data; and
a priority list of personnel for contacting by the central data server in an event the analyzed data indicates an emergency at a capsule location.

20. The environmental monitoring network of claim 19, wherein the capsules are positioned at a designated perimeter, wherein sensors in the capsules are configured to detect at least one of seismic, acoustic, infrared, and visual signals around the perimeter to operate as an electronic fence for detection and protection from outside intruders.

* * * * *